(12) United States Patent
Pianka et al.

(10) Patent No.: US 11,696,636 B2
(45) Date of Patent: Jul. 11, 2023

(54) CUSTOMIZED ASSISTIVE GRIPPING DEVICE

(71) Applicants: Sean Thomas Pianka, Los Angeles, CA (US); Andrew Francis O'Rourke, Los Angeles, CA (US); Neha Kambam Reddy, Los Angeles, CA (US); Zoe de Nevers Trutner, Los Angeles, CA (US); Maxwell David Melin, Los Angeles, CA (US); Chinonyelum Pamela Ikeanyi, Rancho Cucamonga, CA (US)

(72) Inventors: Sean Thomas Pianka, Los Angeles, CA (US); Andrew Francis O'Rourke, Los Angeles, CA (US); Neha Kambam Reddy, Los Angeles, CA (US); Zoe de Nevers Trutner, Los Angeles, CA (US); Maxwell David Melin, Los Angeles, CA (US); Chinonyelum Pamela Ikeanyi, Rancho Cucamonga, CA (US)

( * ) Notice: Subject to any disclaimer, the term of this patent is extended or adjusted under 35 U.S.C. 154(b) by 297 days.

(21) Appl. No.: 16/876,040

(22) Filed: May 16, 2020

(65) Prior Publication Data

US 2021/0307501 A1    Oct. 7, 2021

Related U.S. Application Data

(60) Provisional application No. 63/005,261, filed on Apr. 4, 2020.

(51) Int. Cl.
*A46B 17/02* (2006.01)
*B25G 1/10* (2006.01)
*B33Y 50/00* (2015.01)
*B33Y 70/00* (2020.01)
*B33Y 80/00* (2015.01)

(52) U.S. Cl.
CPC .............. *A46B 17/02* (2013.01); *B25G 1/102* (2013.01); *B33Y 50/00* (2014.12); *B33Y 70/00* (2014.12); *B33Y 80/00* (2014.12)

(58) Field of Classification Search
None
See application file for complete search history.

(56) References Cited

U.S. PATENT DOCUMENTS

| | | | | |
|---|---|---|---|---|
| 4,283,808 A | * | 8/1981 | Beebe | A46B 5/02 401/6 |
| 6,036,385 A | * | 3/2000 | Bistrack | B25G 1/102 401/48 |
| 2006/0200912 A1 | * | 9/2006 | Jackson | A01B 1/00 7/110 |

(Continued)

OTHER PUBLICATIONS

Sure Grip Utensils https://www.performancehealth.com/sure-grip-utensil.

(Continued)

*Primary Examiner* — Mohammad M Ameen

(57) ABSTRACT

Customized assistive gripping devices in accordance with embodiments of the invention are disclosed. In one embodiment, a customized assistive gripping device, comprising a body comprising an outer surface that conforms to an interior contour of a user's hand in a gripping configuration; and a slot located inside the body, wherein the slot comprises a first opening for receiving an object.

10 Claims, 15 Drawing Sheets

(56) References Cited

U.S. PATENT DOCUMENTS

2012/0098742 A1     4/2012   Pincus et al.
2015/0321434 A1*   11/2015   Sterman ................ B29C 70/745
                                                                                       264/255
2020/0100947 A1*    4/2020   Moon ..................... A61F 13/06

OTHER PUBLICATIONS

Active Hands https://www.activehands.com/.
EaZyHold https://eazyhold.com/.
Able2Grip https://www.able2grip.com/.
Arthwriter Hand Aid https://www.maddak.com/the-arthwriter-hand-aid-p-27899.html.

* cited by examiner

CUSTOMIZED ASSISTIVE GRIPPING DEVICE

CROSS-REFERENCE TO RELATED APPLICATION

The current application claims priority to U.S. Provisional Patent Application No. 63/005,261, filed on Apr. 4, 2020, the disclosure of which is incorporated herein by reference.

FIELD OF THE INVENTION

The present invention generally relates to rehabilitative devices and more specifically to customized assistive gripping devices.

BACKGROUND

Motor skills involve the action of the muscles. Humans develop motor skills over time as they learn to interact with the world around them. They include activities such as walking, swimming, and playing instruments. Motor skills are strengthened by practice or experience, allowing people to become more precise and efficient in performing certain tasks. While the motor skills people develop are relatively permanent, some conditions or disabilities may result in impairment of these skills.

Some people undergo rehabilitation in order to restore impaired physical, mental, and/or cognitive abilities. These abilities may have been lost or damaged due to a medical condition or injury. Different types of therapies have been developed in order to improve their targeted functions and allow people to regain independence and normalcy in their lives. Therapy may involve the practice of specific exercises or the use of devices to aid certain functions.

SUMMARY OF THE INVENTION

The various embodiments of the present customized assistive gripping device contain several features, no single one of which is solely responsible for their desirable attributes. Without limiting the scope of the present embodiments, their more prominent features will now be discussed below. In particular, the present customized assistive gripping device will be discussed in the context of rehabilitation. However, the use of customized assistive gripping devices for rehabilitation is merely exemplary and various other customized assistive gripping devices may be utilized for other purposes as appropriate to the requirements of a specific application in accordance with various embodiments of the invention. After considering this discussion, and particularly after reading the section entitled "Detailed Description," one will understand how the features of the present embodiments provide the advantages described here.

One aspect of the present embodiments includes the realization that in current assistive grip devices other than the present embodiments, the devices are not personalized to the user's grip contours and/or grip strength. Further, in current assistive grip devices other than the present embodiments, the devices are not interchangeable with various everyday items (may also be referred to as "tools"). For example, current assistive grip devices are designed in a one-size-fits all manner which does not provide adequate strength or precision to the user when utilizing the tool. The present embodiments solve these problems providing a gripping device using a molding of a user's hand in a desired gripping configuration based on the user's individual hand contours and/or hand gripping strength. For example, a user may be provided with a pliable material for the user to grip. In many embodiments, the pliable material may be used to extract data related to the user's hand and/or gripping strength. In various embodiments, the extracted data may be utilized to construct a customized gripping device using various processes, such as, but not limited to, 3D printing processes. The present embodiments thus advantageously provide the user with the customized strength and precision to utilize a tool because it is customized to the user's grip. The present embodiments provide these advantages and enhancements, as described below.

In a first aspect, a customized assistive gripping device is provided, the device comprising a body comprising an outer surface that conforms to an interior contour of a user's hand in a gripping configuration; and a slot located inside the body, wherein the slot comprises a first opening for receiving an object.

In an embodiment of the first aspect, the body further comprises a bottom portion that encloses the slot.

In another embodiment of the first aspect, the body further comprises a top portion, wherein the slot is configured to receive the object from the top portion of the body via the first opening.

In another embodiment of the first aspect, the body further comprises a gap that spans from the first opening to a second opening in the body, wherein the slot is configured to receive the object from the gap.

In another embodiment of the first aspect, the body is formed using a 3D printing process.

In another embodiment of the first aspect, the body is made using polylactic acid.

In another embodiment of the first aspect, the slot comprises a silicone filler piece for securing the object.

In another embodiment of the first aspect, the body further comprises a hinge and a clasp, wherein the clasp is configured to close the gap.

In another embodiment of the first aspect, an adjustable strap may extend from a first location of the body to a second location of the body.

In another embodiment of the first aspect, the adjustable strap is made of a hook-and-loop fastener.

In a second aspect, methods for constructing customized assistive gripping devices in accordance with embodiments of the invention are disclosed. In one embodiment, a method for constructing a customized assistive gripping device comprises providing a pliable material to a user, receiving a pressure applied by a hand of the user on the pliable material, wherein the pressure applied by the user's hand provides an interior contour of the user's hand onto the pliable material, generating 3D image data of the pliable material, constructing a body of the customized assistive gripping device, wherein the body comprises an outer surface that conforms to the interior contour of the user's hand, and constructing a slot located inside the body for receiving an object.

In an embodiment of the second aspect, the method further comprises constructing the body of the customized assistive gripping device using a 3D printing process.

In another embodiment of the second aspect, wherein generating the 3D image data comprises scanning the pliable material, generating image data of a surface of the pliable material, and converting the image data of the surface to the 3D image data.

In another embodiment of the second aspect, the slot is constructed based on a shape of the object.

In another embodiment of the second aspect, the method further comprises attaching an adjustable strap which extends from a first location of the body to a second location of the body.

In another embodiment of the second aspect, the method further comprises inserting a silicone filler piece into the slot.

In another embodiment of the second aspect, the silicone filler piece is removable.

In another embodiment of the second aspect, a bottom portion of the body encloses the slot.

In another embodiment of the second aspect, the body is made using polylactic acid.

In another embodiment of the second aspect, the step of constructing the body of the customized assistive gripping device includes constructing a two-part mold comprising an inner surface that conforms to the interior contour of the user's hand, where the two-part mold comprises a first portion and a second portion, and the first portion and the second portion are aligned using at least one pin, filling the two-part mold with silicone through an open end, allowing the silicone to harden to form the body, and removing the assistive gripping device from the two-part mold.

BRIEF DESCRIPTION OF THE DRAWINGS

The various embodiments of the present customized assistive gripping device now will be discussed in detail with an emphasis on highlighting the advantageous features. These embodiments depict the novel and non-obvious customized assistive gripping device shown in the accompanying drawings, which are for illustrative purposes only. These drawings include the following figures.

DETAILED DESCRIPTION OF THE DRAWINGS

Figure 1A:
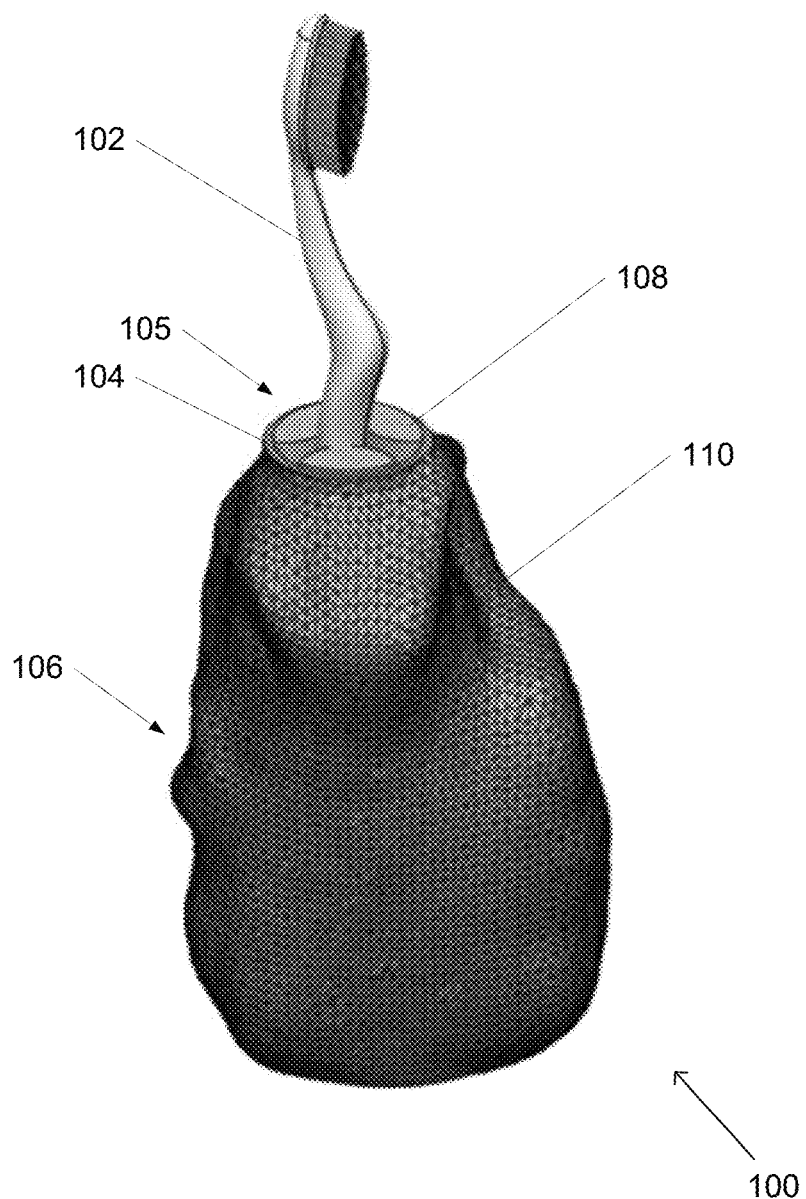
FIG. 1A is a front perspective view a customized assistive gripping device with a slot having a first opening in accordance with an embodiment of the invention.

The following detailed description describes the present embodiments with reference to the drawings. In the drawings, reference numbers label elements of the present embodiments. These reference numbers are reproduced below in connection with the discussion of the corresponding drawing features.

Turning now to the drawings, customized assistive gripping devices in accordance with embodiments of the invention are illustrated. In several embodiments, the device may include a body with an outer surface and a slot. In various embodiments, the outer surface of the body may be configured to fit the contours of an individual user's grasp. For example, the assistive gripping device may be 3D printed to achieve customization. In many embodiments, the slot may have a first opening. For example, the slot may be configured to receive an object from a top portion of the body using the first opening, as further described below. In various embodiments, the slot may have a first opening and a second opening. For example, the slot may be configured to receive an object from a side portion of the body using the first and second openings, as further described below. In various embodiments, the slot may contain a filler piece to secure an object in place. In some embodiments, a hinge and a clasp may be used to secure the object in place, as further described below. Customized assistive gripping devices with a slot having a first opening in accordance with embodiments of the invention are further discussed below.

Customized Assistive Gripping Devices with Slots Having a First Opening

Customized assistive gripping devices may be utilized to allow people with disabilities to regain independence in performing everyday activities and to rehabilitate a user's grip strength. Typically, a user may have diminished grip function as a result of various conditions including, but not limited to, a stroke, arthritis, and other neurological and/or spinal cord injuries. In many embodiments, a customized assistive gripping device may include a slot having a first opening for receiving an object for a user to control. In various embodiments, the slot may be closed on the opposite side of the first opening allowing for the object to be retained by the customized assistive gripping device. Further, the slot may also include an additional piece for securing the object in place, such as, but not limited to, a silicone filler piece. Thus, the customized assistive gripping device may allow for a user to have greater control over objects including, but not limited to, utensils and toothbrushes.

A front perspective view of a customized assistive gripping device with a slot having a first opening in accordance with an embodiment of the invention is shown in FIG. 1A. A customized assistive gripping device 100 may include a body 106 having an outer surface 110 which is shaped to fit the contours of a user's hand in a gripping configuration. In several embodiments, the user's hand may be used to construct the outer surface 110 of the body 106, as further described below. In many embodiments, the outer surface 110 may depict the contours of the user's thumb as it grips an object 102. The customized assistive gripping device 100 may also include a slot 104 having a first opening 105 for receiving the object 102. In some embodiments, the slot 104 may comprise material to secure the object 102. For example, the slot 104 may include material such as, but not limited to, a silicone filler piece 108. The silicone filler piece 108 may secure the object 102 in place within the slot 104 by applying pressure to the object 102 to secure and retain the object 102 within the slot 104. In many embodiments, the object 102 may include various tools such as, but not limited to, forks, knives, and toothbrushes. One of ordinary skill will appreciate that a variety of objects 102 may be used with the same customized assistive gripping device 100.

In further reference to FIG. 1A, a user may use the customized assistive gripping device 100 by placing an object 102 into the slot 104 through the first opening 105. In many embodiments, the object 102 may be secured by pressure from the user's hand as it grips the body 106. In some embodiments, the object 102 may be secured by pressure from material such as, but not limited to, a silicone filler piece 108. The user may place a hand around the body 106, aligning the hand with the outer surface 110 where the contours of the user's hand match the contours of the outer surface 110. The user may apply force to the body 106 to pick up the customized assistive gripping device 100 and use the object 102.

Figure 1B:
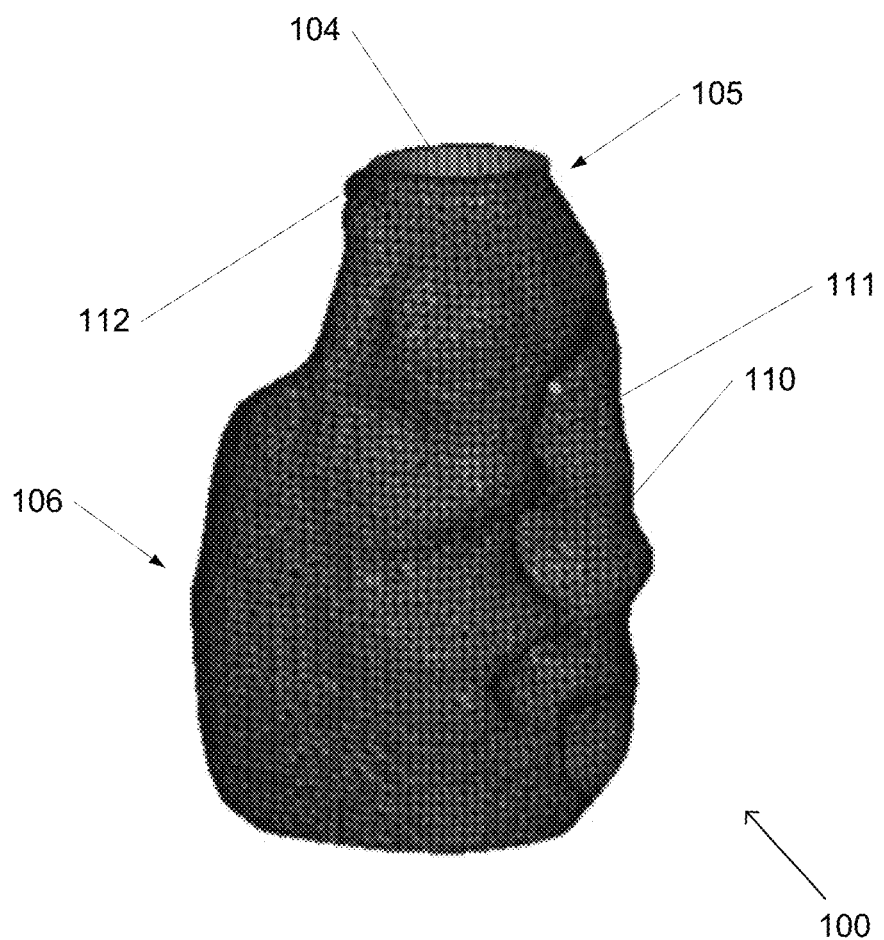
FIG. 1B is a back perspective view of a customized assistive gripping device with a slot having a first opening in accordance with an embodiment of the invention.

In various embodiments, the body of the customized assistive gripping device may match the contours of the outer surface of the user's hand. In addition, the body of the customized assistive gripping device may also have an outer surface that supports the entire user's hand. For example, in some embodiments, the outer surface may various structural features, such as, but not limited to, ridges and/or indents to provide support to the user's hand. A back perspective view of a customized assistive gripping device with a slot having a first opening in accordance with an embodiment of the invention is shown in FIG. 1B. As described above, in various embodiments, a customized assistive gripping device 100 may include a body 106 having an outer surface 110 conforming to the contours of a user's hand and a slot 104 for receiving an object 102 from a first opening 105. In some embodiments, the outer surface 110 may comprise the contours of the user's fingers gripping the body 106. For example, the outer surface 110 may include ridges 111 corresponding to the edges of the user's hand. In various embodiments, the ridges 111 may provide additional support to the user in using the customized assistive gripping device 100. In addition, the ridges 111 may be customized to the dimensions of the particular user's hand shape and/or size.

Figure 1C:
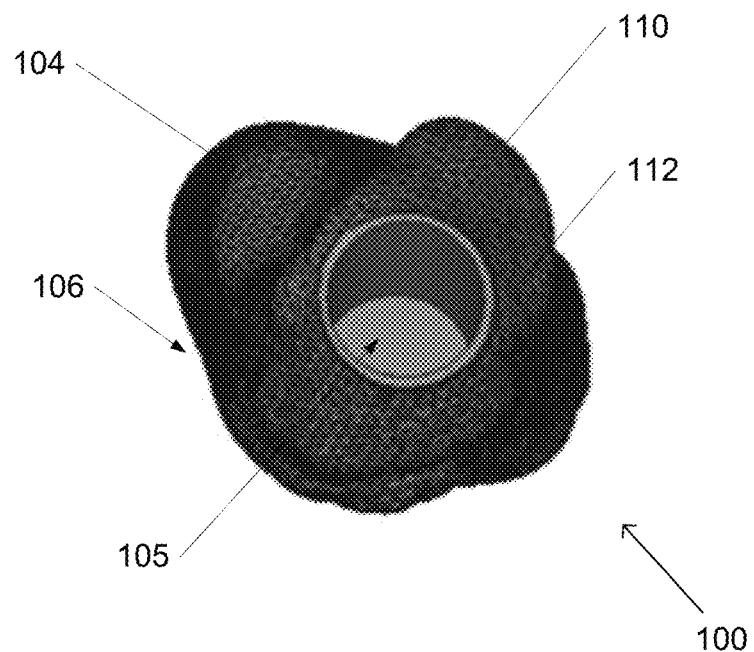
FIG. 1C is a top perspective view of a customized assistive gripping device with a slot having a first opening in accordance with an embodiment of the invention.

A top perspective view of a customized assistive gripping device with a slot having a first opening in accordance with an embodiment of the invention is shown in FIG. 1C. In many embodiments, a customized assistive gripping device 100 may comprise a body 106 having a slot 104 having a first opening 105 which may be configured to receive an object 102. In some embodiments, the first opening 105 may be in a top portion 112 of the body 106. In various embodiments, the top portion 112 may be positioned between the user's thumb and index finger. In various embodiments, users may utilize objects 102 including, but not limited to, utensils and/or toothbrushes, when the objects 102 are received by the slot 104 from the top portion 112 of the customized assistive gripping device 100.

Figure 1D:
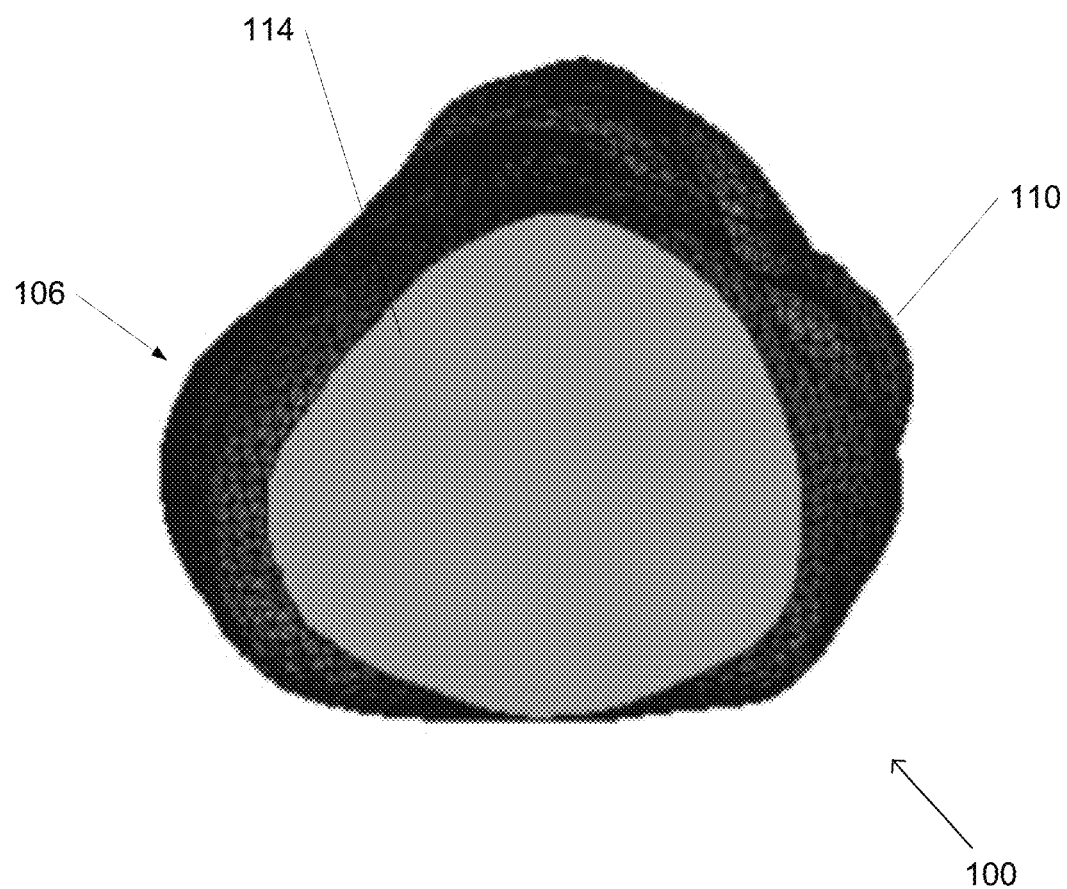
FIG. 1D is a bottom perspective view of a customized assistive gripping device with a slot having a first opening in accordance with an embodiment of the invention.

A bottom perspective view of a customized assistive gripping device with a slot having a first opening in accordance with an embodiment of the invention is shown in FIG. 1D. In several embodiments, a customized assistive gripping device 100 may comprise a body 106 having a top portion and a bottom portion 114. In various embodiments, the bottom portion 114 may be closed so that an object 102 may not pass through the body 106 in its entirety. In some embodiments, the bottom portion 114 may be positioned near the user's pinky finger. In many embodiments, the bottom portion 114 may be positioned under the slot 104. In a variety of embodiments, the bottom portion 114 may be closed such that the bottom portion 114 applies pressure to an object 102. For example, some objects 102, such as utensils and/or toothbrushes, may be secured to the customized assistive gripping by the bottom portion 114.

Figure 1E:
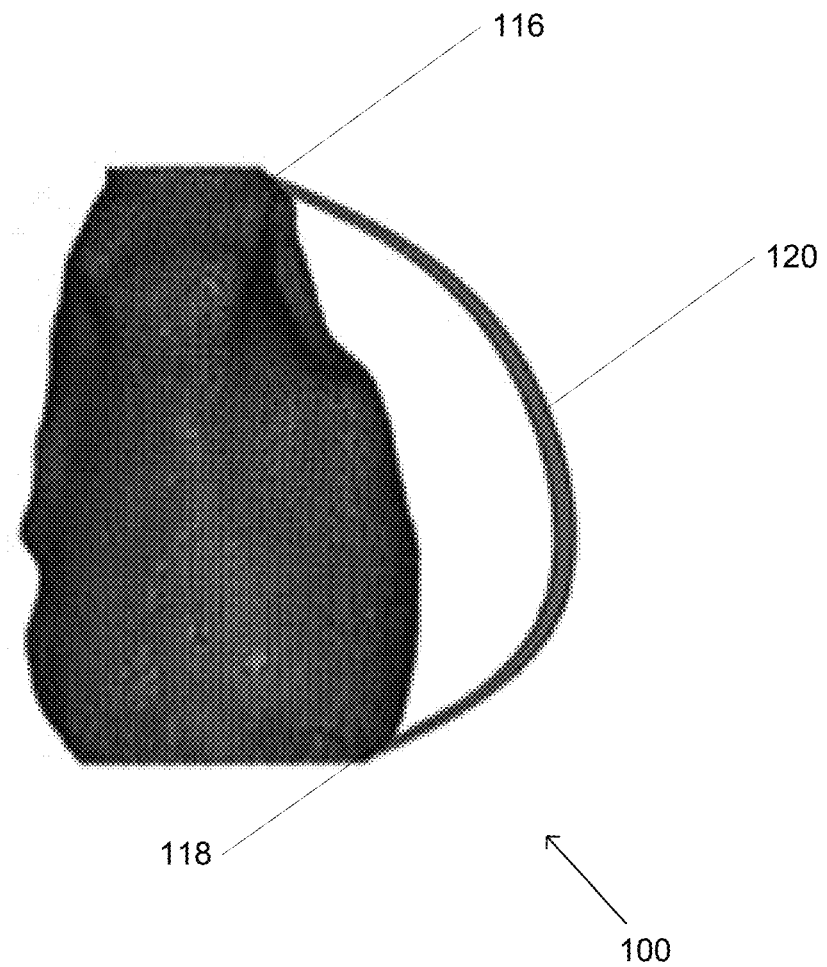
FIG. 1E is a front perspective view of a customized assistive gripping device with a slot having a first opening and a strap in accordance with an embodiment of the invention.

A front perspective view of a customized assistive gripping device with a slot having a first opening and a strap in accordance with an embodiment of the invention is shown in FIG. 1E. In various embodiments, a customized assistive gripping device 100 may include an adjustable strap 120. In several embodiments, the adjustable strap 120 may extend from a first location of the body 116 to a second location of the body 118. In many embodiments, the adjustable strap 120 may assist in securing the device 100 to the user's hand. For example, the adjustable strap 120 may extend over the back of the user's hand and/or the user's wrist. In many embodiments, the adjustable strap 120 may be adjustable to become tighter or looser depending on the user's preference. In some embodiments, the strap 120 may be made of a hook-and-loop fastener.

Although specific customized assistive gripping devices with a slot having a first opening are discussed above with respect to FIGS. 1A-E, any of a variety of customized assistive gripping devices incorporating slots, having various body shapes and/or outer surfaces, etc. may be used in accordance with embodiments of the invention. Customized assistive gripping devices with slots having a first opening and a second opening in accordance with embodiments of the invention are discussed further below.

Customized Assistive Gripping Devices with Slots Having First and Second Openings Some users may desire to utilize objects that may require a customized assistive gripping device to receive the objects in a different configuration than described above. One such configuration may include a slot having a first opening and a second opening. A customized assistive gripping device including a slot having a first opening and a second opening may receive objects including, but not limited to, writing utensils, car steering wheels, and/or walkers.

Figure 2A:
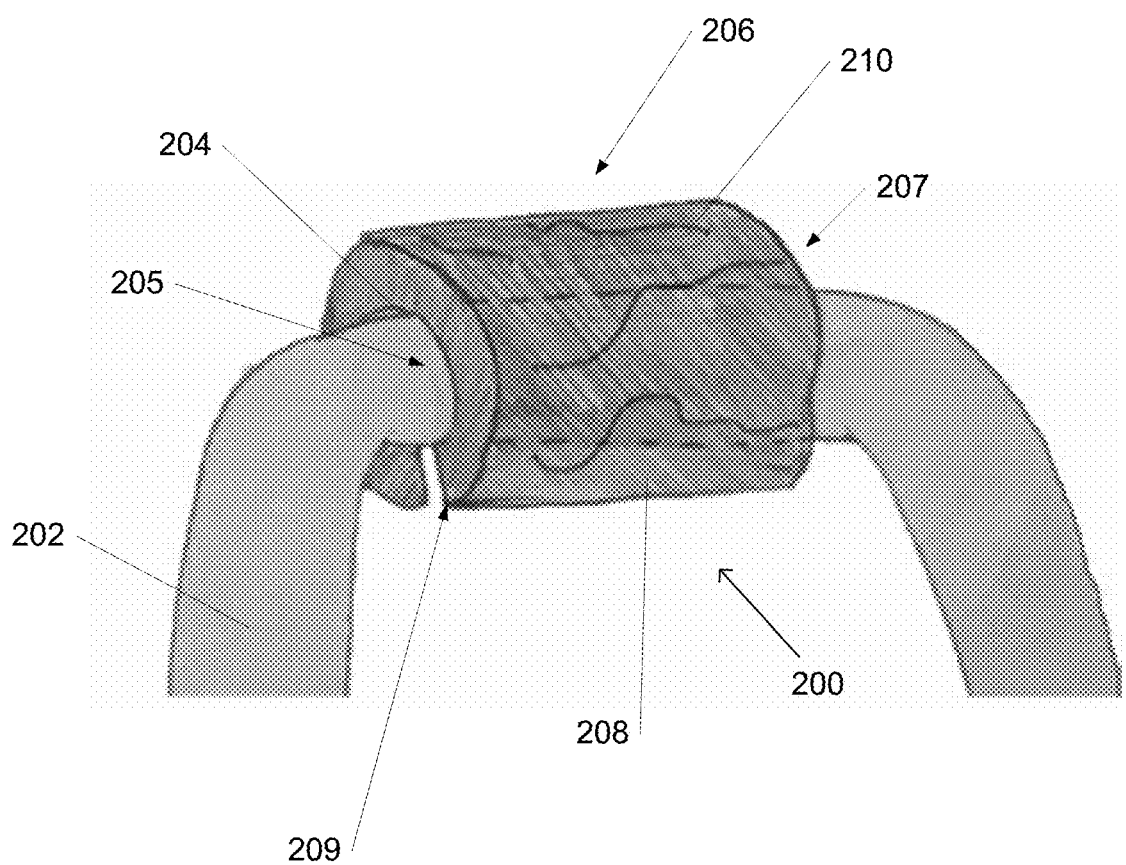
FIG. 2A is a front perspective view of a customized assistive gripping device with a slot having a first opening and a second opening in accordance with an embodiment of the invention.

A front perspective view of a customized assistive gripping device with a slot having a first opening and a second opening in accordance with an embodiment of the invention is shown in FIG. 2A. In several embodiments, a customized assistive gripping device 200 may comprise a body 206 having an outer surface 210 conforming to the contours of the user's hand, as further described above. In many embodiments, the device 200 may include a slot 204 having a first opening 205 and a second opening 207 that allows an object 202 pass through the slot 204. In various embodiments, the customized assistive gripping device 200 may receive the object 202 from a side portion 208 of the body 206 via a gap 209 where the gap 209 allows the customized assistive gripping device 200 to provide access to the slot 204.

In further reference to FIG. 2A, a user may use the customized assistive gripping device 200 by placing the object 202 in the slot 204 through the gap 207. In various embodiments, the object 202 may extend through the first opening 205 and the second opening 207. For example, objects 202 that may pass through the first opening 205 and the second opening 207 include, but are not limited to, pencils, pens, steering wheels, and walkers. In some embodiments, the object 202 may be secured by pressure applied by the user's hand when gripping the body 206.

Figure 2B:
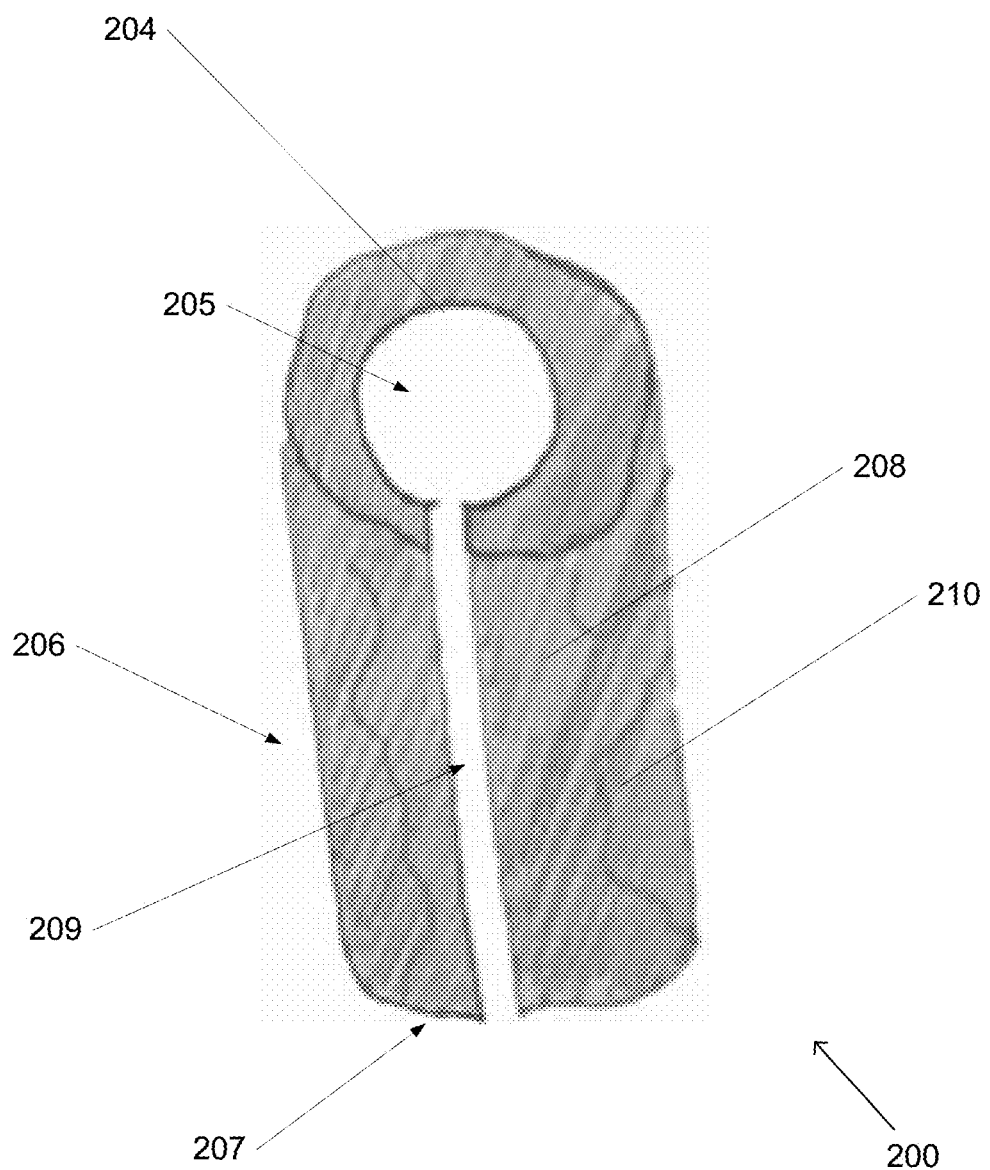
FIG. 2B is a side perspective view of a customized assistive gripping device with a slot having a first opening and a second opening in accordance with an embodiment of the invention.

A side perspective view of a customized assistive gripping device with a slot having a first opening and a second opening in accordance with an embodiment of the invention is shown in FIG. 2B. A customized assistive gripping device 200 may include a body 206 comprising an outer surface 210, wherein the outer surface 210 conforms to the contours of the user's hand, as described above. In addition, the customized assistive gripping device 200 may include a slot 204, wherein the slot may be positioned to run along a side portion 208 of the body 206. In several embodiments, the slot 204 may extend from a first opening 205 to a second opening 207. In some embodiments, the body 206 may expose a gap 209 that allows the customized assistive gripping device 200 to provide access to the slot 204. In many embodiments, the slot 204 may be in an angled configuration along the side portion 208 of the body 210.

Although specific customized assistive gripping devices with a slot having a first opening and a second opening are discussed above with respect to FIGS. 2A-B, any of a variety of devices incorporating a slot with various openings including, but not limited to, opening shapes and sizes may be used in accordance with embodiments of the invention. Customized assistive gripping devices with hinges in accordance with embodiments of the invention are discussed further below.

Customized Assistive Gripping Devices with Hinges

Customized assistive gripping devices may also include a hinge that allows for easy placement and removal of the customized assistive gripping device from an object. Further, some users may desire to utilize larger objects that may involve a customized assistive gripping device having a wide gap to receive the object. Some users may also desire to leave the customized assistive gripping device on some objects for continued use of the same object. As further described below, various embodiments of the device may include a hinge and/or a clasp. Exemplary objects which may be utilized with a customized assistive gripping device with a hinge may include, but are not limited to, walkers and steering wheels.

Figure 3A:
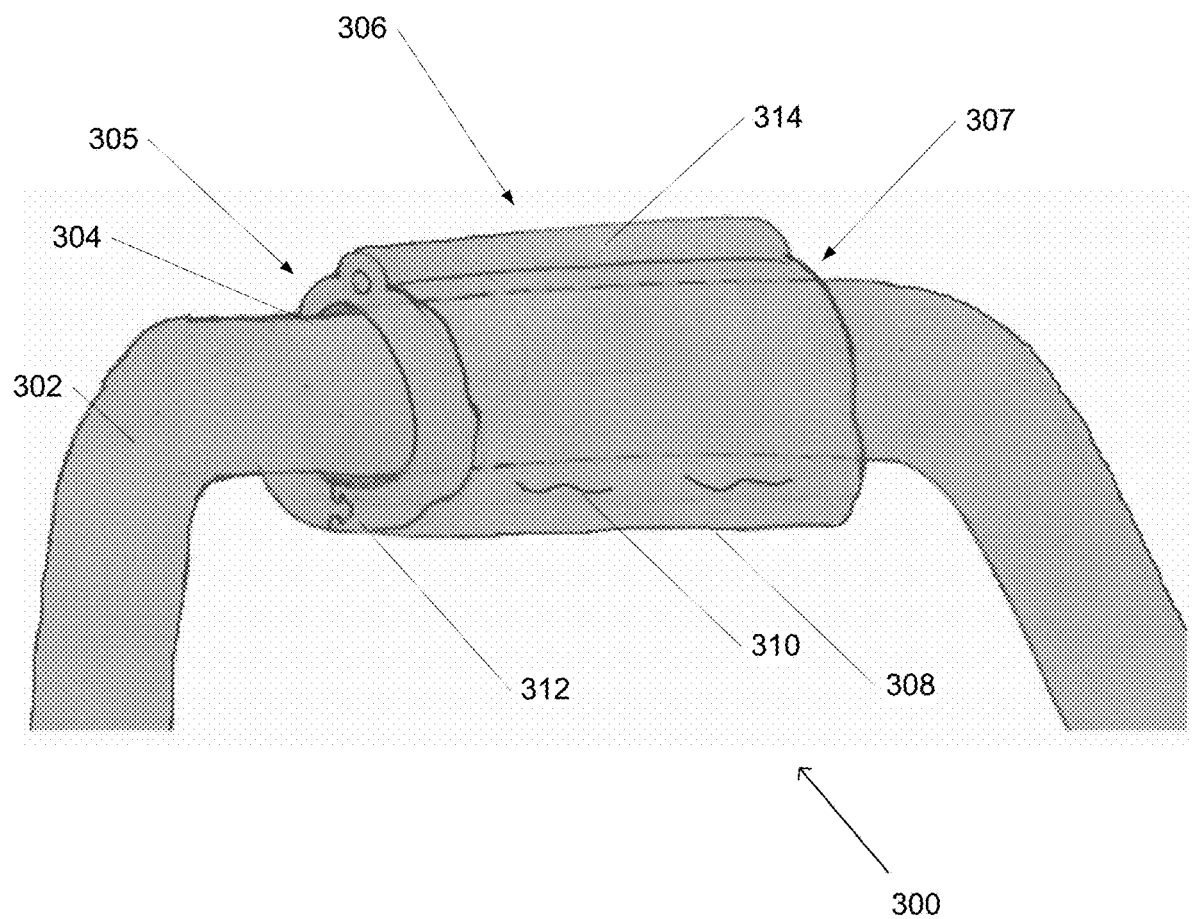
FIG. 3A is a front perspective view of a customized assistive gripping device with a hinge in accordance with an embodiment of the invention.

A front perspective view of a customized assistive gripping device with a hinge in accordance with an embodiment of the invention is shown in FIG. 3A. A customized assistive gripping device 300 may include a body 306 comprising an outer surface 310 matching the contours of a user's hand, as further described above. The customized assistive gripping device 300 may also include a slot 304 for receiving an object 302 from a side portion 308 of the body 306 using a gap created when the body 306 is opening using a hinge 314. In many embodiments, the object 302 be located between a first opening 305 and a second opening 307 of the slot 304. In various embodiments, the side portion 308 may include a clasp 312 to close the gap when the customized assistive gripping device 300 has recited the object 302. For example, the clasp 312 may secure the object 302 in place. In some embodiments, the hinge 314 may be located opposite the clasp 312. In many embodiments, the hinge 314 and the clasp 312 may be made with and be part of the body 306 utilizing various processes, such as, but not limited to, 3D printing processes, as further described below.

In further reference to FIG. 3A, a user may use the customized assistive gripping device 300 by opening the clasp 312, separating the side portion 308 of the body 306 to expose a gap, and placing the object 302 into the body 306 through the gap created by separating the side portion 308 of the body 306. In many embodiments, the side portion 308 may separate about the hinge 306. For example, the hinge may allow the slot 304 to receive objects 302 such as, but not limited to, walkers and/or steering wheels. In some embodiments, the slot 304 may also be lined with a compressible material allowing for the customized assistive gripping device 300 to receive objects 302 of varying size (e.g., thickness). In such embodiments, the compressible material may compress depending on the thickness of the object 302 that is received. In several embodiments, the object 302 may extend through the first opening 305 and the second opening 307, as described above. The customized assistive gripping device 200 may close and secure the object 302 by securing the clasp 312. In use, the user may place their hand around the body 306 and align the user's fingers to the corresponding contours of the outer surface 310, as described above. The user may grip the device 300 and use the object 302.

Figure 3B:
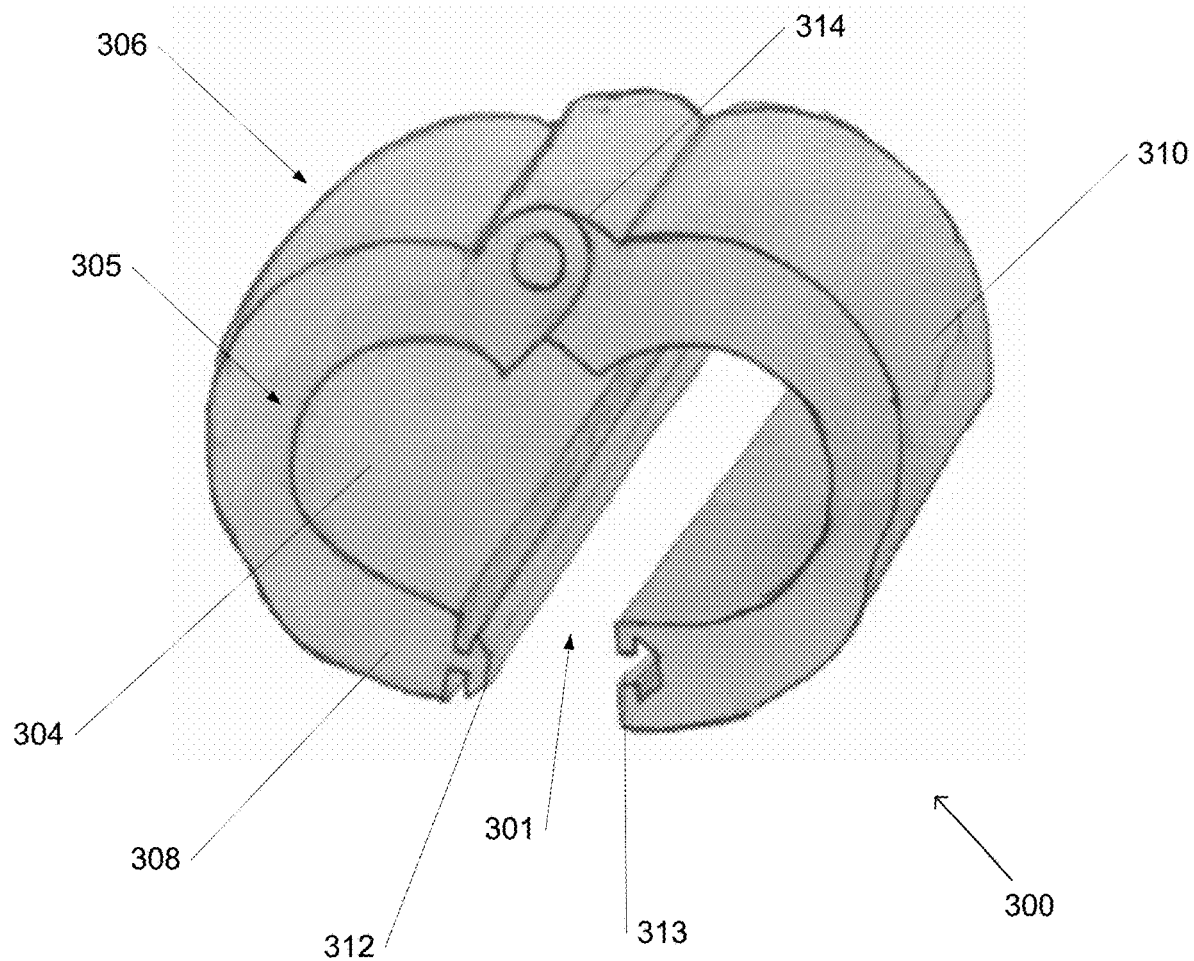
FIG. 3B is a side perspective view illustrating an open configuration of a customized assistive gripping device with a hinge in accordance with an embodiment of the invention.

A side perspective view illustrating an open configuration of a customized assistive gripping device with a hinge in accordance with an embodiment of the invention is shown in FIG. 3B. As described further above, a customized assistive gripping device 300 having a body 306 comprising an outer surface 310 and a slot 304 may further include a hinge 314. In many embodiments, the hinge 314 may be used to widen a gap 301 to provide access to the slot 304 to receive an object 302. In some embodiments, the hinge 314 may be opposite a clasp, as further described below. In various embodiments, the clasp may include a first engagement member 312 and a second engagement member 313. In several embodiments, the open configuration of the customized assistive gripping device 300 may be when the first engagement member 312 and the second engagement member 313 are disconnected (may also be referred to as "disengaged").

Figure 3C:
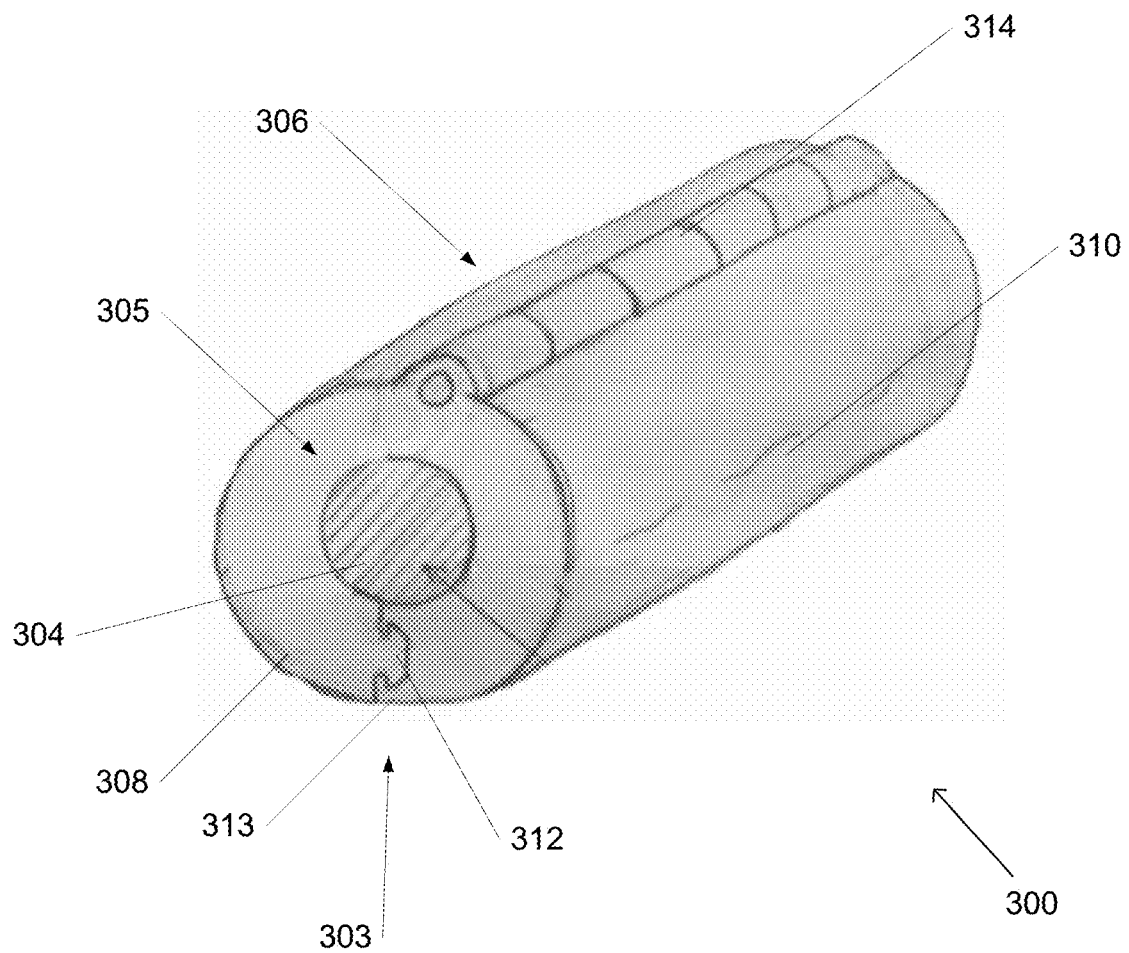
FIG. 3C is a side perspective view illustrating a closed configuration of a customized assistive gripping device with a hinge in accordance with an embodiment of the invention.

A side perspective view illustrating a closed configuration of a customized assistive gripping device with a hinge in accordance with an embodiment of the invention is shown in FIG. 3C. As described above, a customized assistive gripping device 300 comprising a body 306 having an outer surface 310 and a slot 304 may further include a clasp 303. In many embodiments, the clasp 303 may include a first engagement member 312 and a second engagement member 313. In several embodiments, the closed configuration of the customized assistive gripping device 300 may be when the first engagement member 312 and the second engagement member 313 are connected (may also be referred to as "engaged"). In various embodiments, the clasp 303 may be configured along a side portion 308 of the body 306. In some embodiments, the clasp 303 may secure the object 302 in place. For example, the clasp 303 may hold the side portion 308 together when in the closed configuration. Although specific customized assistive gripping devices with a hinge and a clasp are discussed above with respect to FIGS. 3A-C, any of a variety of configurations as appropriate to the requirements of a specific application can be utilized in accordance with embodiments of the invention. Processes for constructing a customized assistive gripping device which uses 3D image data of the pliable material to construct the body of the customized assistive gripping device in accordance with embodiments of the invention are further discussed below.

Processes for Constructing Customized Assistive Gripping Devices Having a First Opening A customized assistive gripping device may be constructed using 3D image data of a pliable material. In many embodiments, a user may be provided a pliable material where the user may squeeze the pliable material to imprint the interior contours of the user's hand onto the pliable material. In various embodiments, the interior contours may also be of the user's hand in a particular gripping configuration. For example, a user may be fitted for a customized assistive gripping device for objects where a typical user would grip the object when in use. For example, in constructing a customized assistive gripping device for receiving a tooth brush, the process may include proving a certain size of a pliable material to allow the user to grip and squeeze the pliable material so that the interior contours of the user's hand may be optimized for the use of a particular object (e.g., the tooth brush) or a group of objects (e.g., tooth brush, utensils, etc.).

Figure 4:
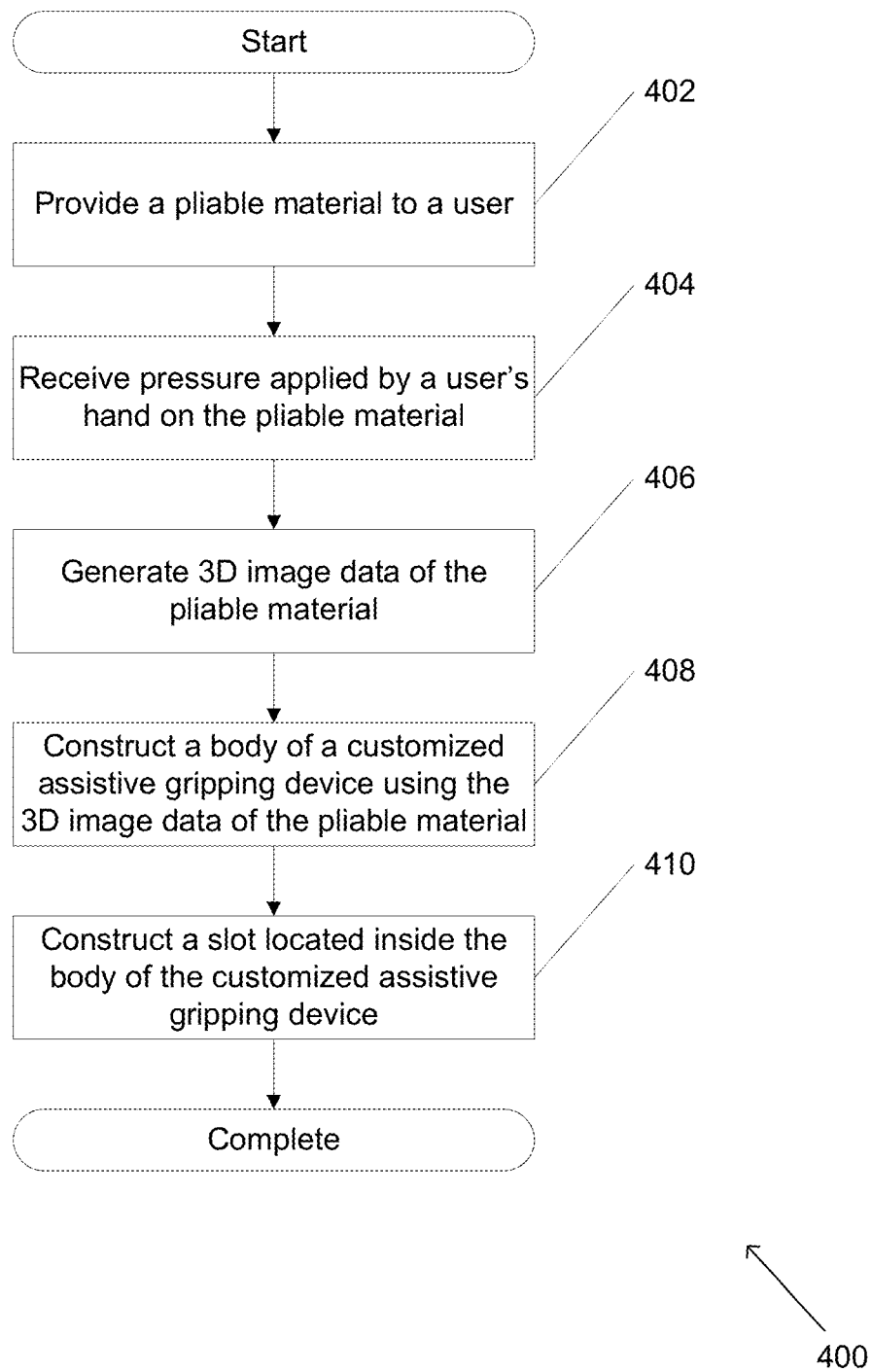
FIG. 4 is a flow chart illustrating a process for constructing a customized assistive gripping device with a slot having a first opening (may also be referred to as "a customized assistive gripping device") in accordance with an embodiment of the invention.

A process for constructing a customized assistive gripping device with a slot having a first opening in accordance with an embodiment of the invention is illustrated in FIG. 4. The process 400 may include providing (402) a pliable material to a user. In many embodiments, the pliable material may be made by any material that is malleable and easy to change its shape once pressure is applied. For example, in some embodiments, the pliable material comprises clay. As described above, a user may squeeze the pliable material to imprint the interior contours of the user's hand onto the pliable material. In various embodiments, the interior contours may also be of the user's hand in a particular gripping configuration, as described above. The process 400 may also include receiving (404) pressure applied by the user's hand on the pliable material. For example, the user may hold the pliable material, such that the shape of the pliable material may change and conform to the interior contours of the user's hand while gripping. In some embodiments, there may not be a specific pressure threshold and/or a gripping pattern that must be applied to the pliable material. Instead, the user may hold and grip the pliable material in a way the user feels most comfortable for a particular use intended for the customized assistive gripping device. In some embodiments, the amount of pressure (404) that is applied by the user on the pliable material may be an indicator of the current strength that a user is able to provide. In such embodiments, the rehabilitation of the user's gripping strength may be monitored and factored into the construction of the customized assistive gripping device. After holding the pliable material, the user may release the pliable material, and the pliable material may have an outer surface that matches the interior contours of the user's hand while gripping.

In reference to FIG. 4, the process 400 may also include generating (406) 3D image data of the pliable material, as further described below. In addition, the process 400 may also include constructing (408) a body of the customized assistive gripping device using the 3D image data of the pliable material. For example, the body of the customized assistive gripping device may be constructed (408) using a variety of processes known to one of ordinary skill in the art. For example, the body may be constructed (408) using various 3D printing processes. In many embodiments, the 3D image data of the pliable material may reflect the interior contours of the user's hand while gripping, and thus the outer surface of the body may conform to the interior contours of the user's hand while gripping. Also, a variety of materials may be used to construct the body. In some embodiments, the body is constructed using polylactic acid.

In further reference to FIG. 4, the process 400 may also include constructing (410) a slot inside the body of the customized assistive gripping device. The slot may enable an object to be inserted into the customized assistive gripping device. For example, the slot may have a first opening for receiving an object as further described above. In some embodiments, the slot may be constructed (410) based on a shape of the object. In various embodiments, the construction (410) of the slot may be performed using a variety of processes known to one of ordinary skill in the art. For example, the slot may be constructed (410) using various 3D printing process, as described herein. In some embodiments, the slot may be constructed (410) by a drilling process.

Figure 5:
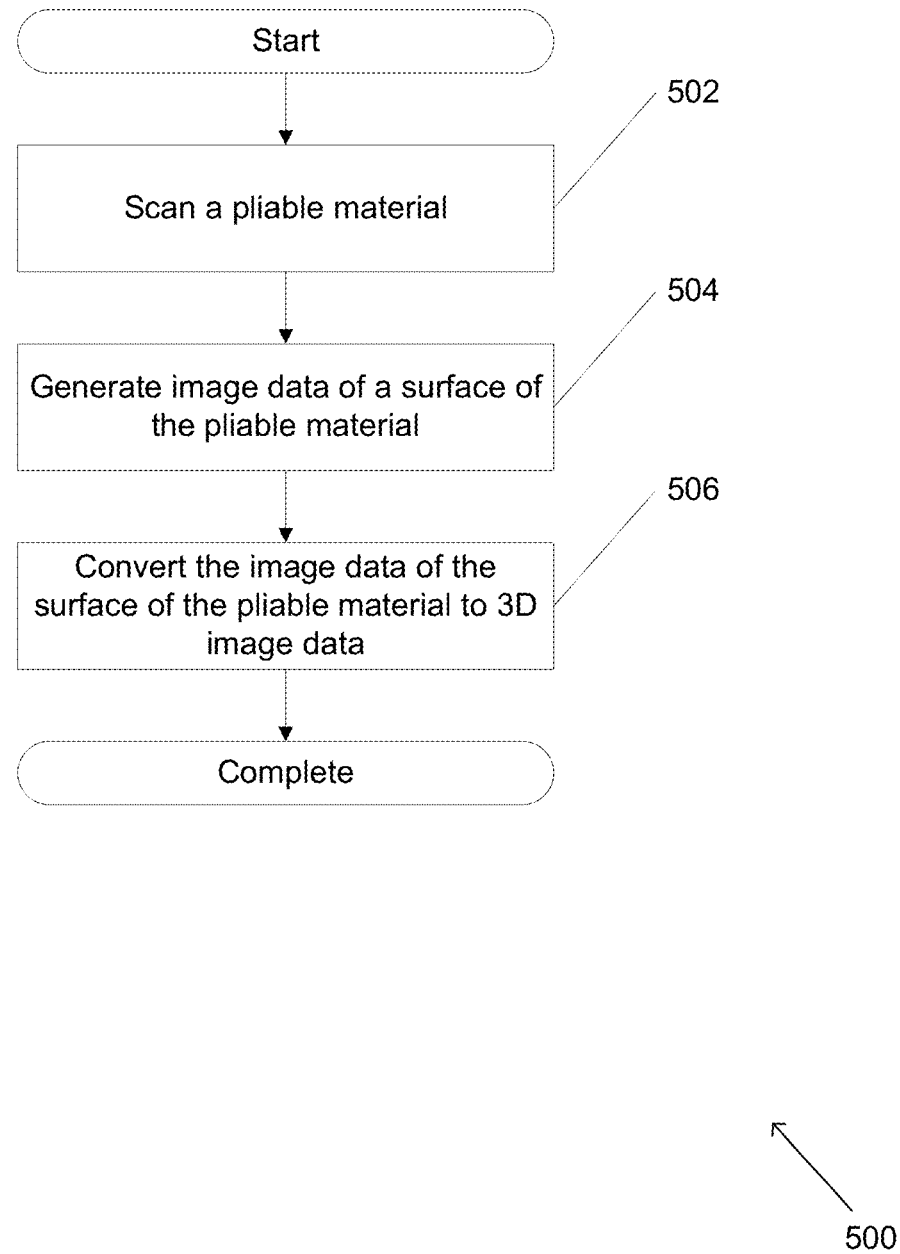
FIG. 5 is a flow chart illustrating a process for generating 3D image data in constructing a customized assistive gripping device with a slot having a first opening in accordance with an embodiment of the invention.

A flow chart illustrating a process for generating (406) 3D image data in constructing a customized assistive gripping device in accordance with an embodiment of the invention is illustrated in FIG. 5. The process 500 may include scanning (502) the surface of the pliable material using a 3D scanner. However, one of ordinary skill would appreciate that the use of a 3D scanner is exemplary and various scanning technologies may be applied. Further, in some embodiments, the 3D scanner may be a structured-light 3D scanner, a modulated light 3D scanner, an ultrasound 3d scanner, and/or an X-ray 3D scanner. In many embodiments, the process 500 may also include generating (504) image data of the surface of the pliable material. In various embodiments, a variety of processes known to one of ordinary skill in the art may be used to generate (504) the image data of the surface of the pliable material. For example, the image data generated by the 3D scanner may include point clouds, polygon mesh, curved surface patches, solid CAD models, a set of 2D slices, laser scans, or photographs. Also, various programs and/or computer applications connected to a 3D scanner may generate (504) the image data based on the scan (502) of the pliable material. In some embodiments, suitable programs and/or computer applications may include 3DF Zephyr, IMAGINE Photogrammetry, MeshLab, PhotoModeler, SketchUp, and Tomviz. In addition, the process 500 may also include converting (506) the image data of the surface of the pliable material to 3D image data. The conversion (506) may be performed utilizing a variety of processes known to one of ordinary skill in the art. For example, the 3D image data may be reconstructed from point clouds, from polygon mesh, from curved surface patches, from solid CAD models, from a set of 2D slices, from laser scans, or from photographs.

Figure 6:
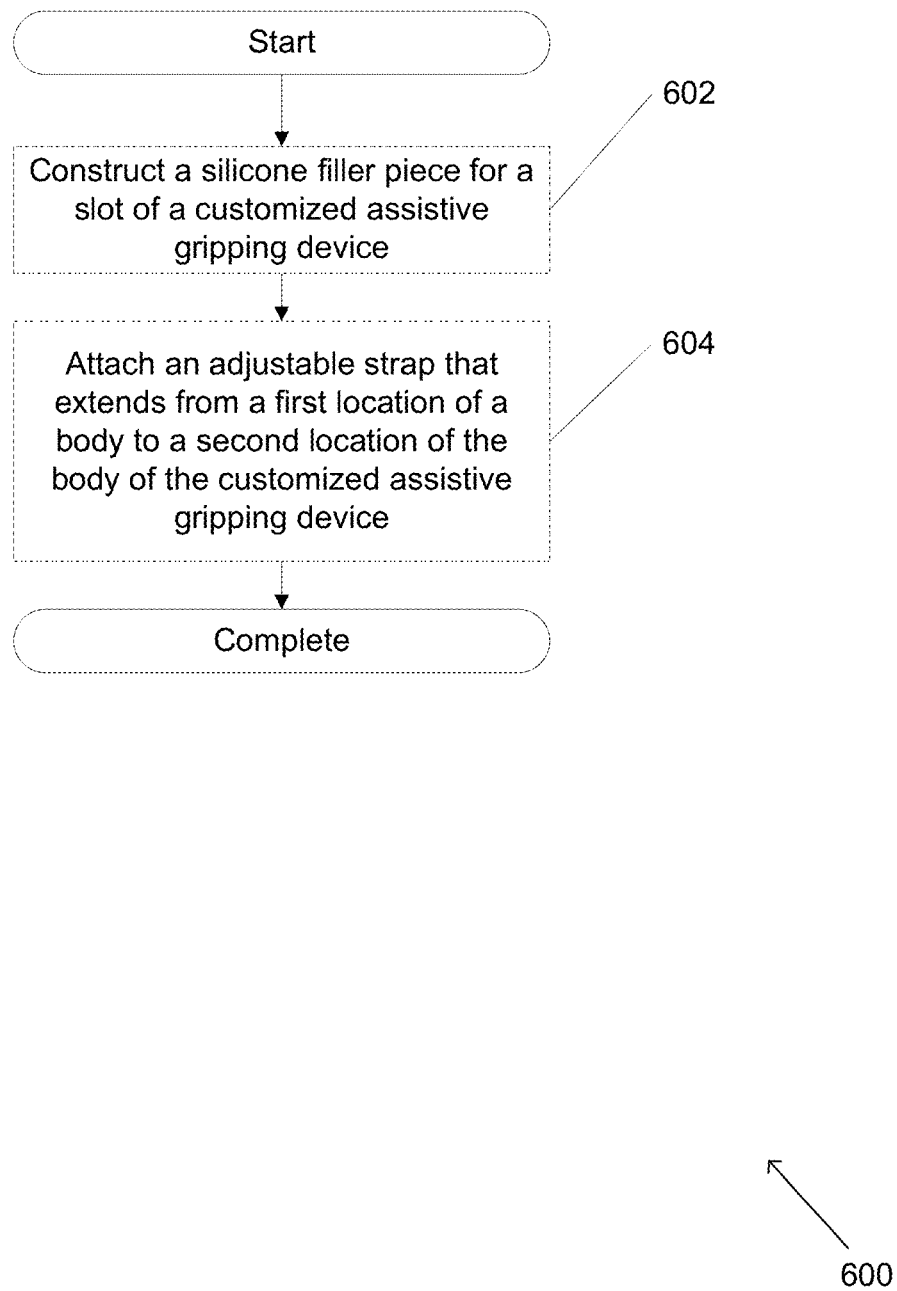
FIG. 6 is a flow chart illustrating a process for constructing a customized assistive gripping device with a slot having a first opening in accordance with an embodiment of the invention.

A flow chart illustrating a process for constructing a customized assistive gripping device with a slot having a first opening in accordance with an embodiment of the invention is illustrated in FIG. 6. The process 600 may include inserting (602) a silicone filler piece into the first opening of the slot. By inserting the silicone filler piece, additional adhesion of the object may be provided such that the object may be held more securely by the customized assistive gripping device. In many embodiments, the silicone filler piece may fit with the slot without additional adhesives. In various embodiments, a variety of silicone filler pieces known to one of ordinary skill in the art may be used. Further, the silicone filler piece may be either removable or non-removable.

In reference to FIG. 6, the process 600 may include attaching (604) an adjustable strap to the body of the customized assistive gripping device. In many embodiments, the adjustable strap may be tightened on the user's hand and/or wrist to ensure that the customized assistive gripping device is secure. In various embodiments, the adjustable strap may include different designs and/or features known to one of ordinary skill in the art may be applied. For example, the adjustable strap may extend from a first location of the body to a second location of the body. In some embodiments, the first location may be a point adjacent to the top portion 112, and the second location may be a point adjacent to the bottom portion 114. In this manner, the user's entire palm may be wrapped by the adjustable strap. In some other embodiments, the distance between the first location and the second location may be the same as the width of one or more of the user's fingers. In this manner, the user's one or more fingers may be wrapped by the adjustable strap. The adjustable strap may also be tighten or loosen using a variety of methods known to one of ordinary skill in the art. For example, the adjustable strap may include a hook-and-loop fastener, a buckle, or a strap adjuster.

Although specific processes for constructing customized assistive gripping devices with slots having a first opening pliable material are discussed above with respect to FIGS. 4-6, any of a variety of processes including a variety of 3D scanning techniques, 3D image generating techniques, body constructing techniques and materials, opening forming techniques, enhanced object securing mechanisms, and/or hand tightening mechanisms as appropriate to the requirements of a specific application can be utilized in accordance with embodiments of the invention. Processes for constructing an assistive gripping device with a slot having a first opening and a second opening in accordance with embodiments of the invention are discussed further below.

Processes for Constructing Assistive Gripping Devices Having a First and Second Openings An assistive gripping device may be constructed using a mold. In many embodiments, a mold may include an inner surface that conforms to the interior contours of the user's hand. In various embodiments, the assistive gripping device may be constructed by filling the mold with silicone (or any other suitable material), and removing the silicone from the mold after hardening. In some embodiments, the assistive gripping device may have a slot with a first opening and a second opening, such that the slot enables the assistive gripping device to be attached onto an object, as described above. For example, the assistive gripping device may be attached to a walker handle and/or a steering wheel so as to provide the user an individualized grip as discussed herein.

Figure 7:
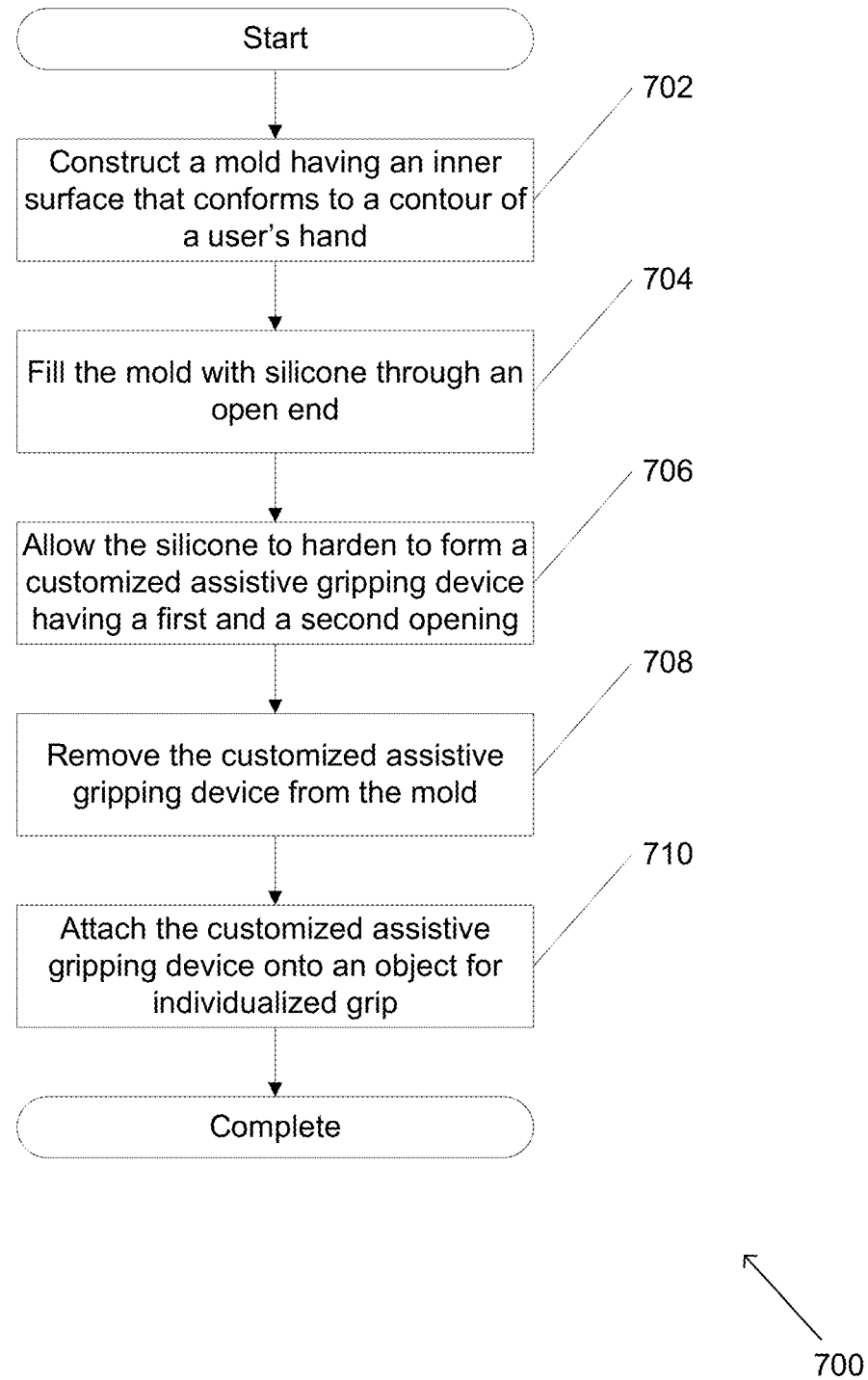
FIG. 7 is a flow chart illustrating a process for constructing an assistive gripping device with a slot having a first opening and a second opening in accordance with an embodiment of the invention.

A process for constructing an assistive gripping device with a slot having a first opening and a second opening in accordance with an embodiment of the invention is illustrated in FIG. 7. The process 700 may include constructing (702) a mold having an inner surface that conforms to the interior contours of a user's hand. In some embodiments, the interior contours of the user's hand may be in a gripping configuration, as further described above. In many embodiments, the mold may be a two-part mold, as further described below. Various techniques may be used to construct the inner surface of the mold. For example, similar to the construction of the customized assistive gripping device as described above, a user may be provided with a pliable material where the user may squeeze the pliable material to imprint the interior contours of the user's hand onto the pliable material. In some embodiments, the user may hold and grip the pliable material in a way the user feels most comfortable for a particular use intended for the assistive gripping device. After holding the pliable material, the user may release the pliable material, and the pliable material may have an outer surface that matches the interior contours of the user's hand while gripping. The pliable material may then be scanned to generate 3D image data of the pliable material, which may reflect the interior contours of the user's hand while gripping. The 3D image data may eventually be used to construct the mold including an inner surface that conforms to the interior contours of the user's hand. Various methods known to one of ordinary skill in the art may be applied to construct the mold. For example, various 3D printing processes may be used to construct the mold. Furthermore, the mold may also contain a part extending from a first end to a second end. This extending part may thereby create a slot with a first opening end and a second opening end, as further described below. After the mold is constructed, it may be filled with a suitable material such as, but not limited to, silicone, for producing assistive gripping devices, as described below.

In reference to FIG. 7, the process 700 may also include filling (704) the mold with silicone through an open end. In addition, the process 700 may also include allowing (706) the silicone to harden to form an assistive gripping device with a slot having a first opening and a second opening. Because the inner surface of the mold conforms to the interior contours of the user's hand while gripping, the solidified silicone would also have an outer surface that conforms to the interior contours of the user's hand while gripping. Furthermore, since the mold contains a portion that extends from a first end to a second end, the portion may thereby create a slot with a first opening end and a second opening end.

In further reference to FIG. 7, the process 700 may also include removing (708) the assistive gripping device from the mold. After the assistive gripping device is removed, it may be attached (710) onto an object to provide the user with an individualized grip to the object, as further described above. A variety of objects may be attached to the customized assistive gripping device. For example, the assistive gripping device may be attached to a walker handle such that the user may grip the handle more easily.

Figure 8:
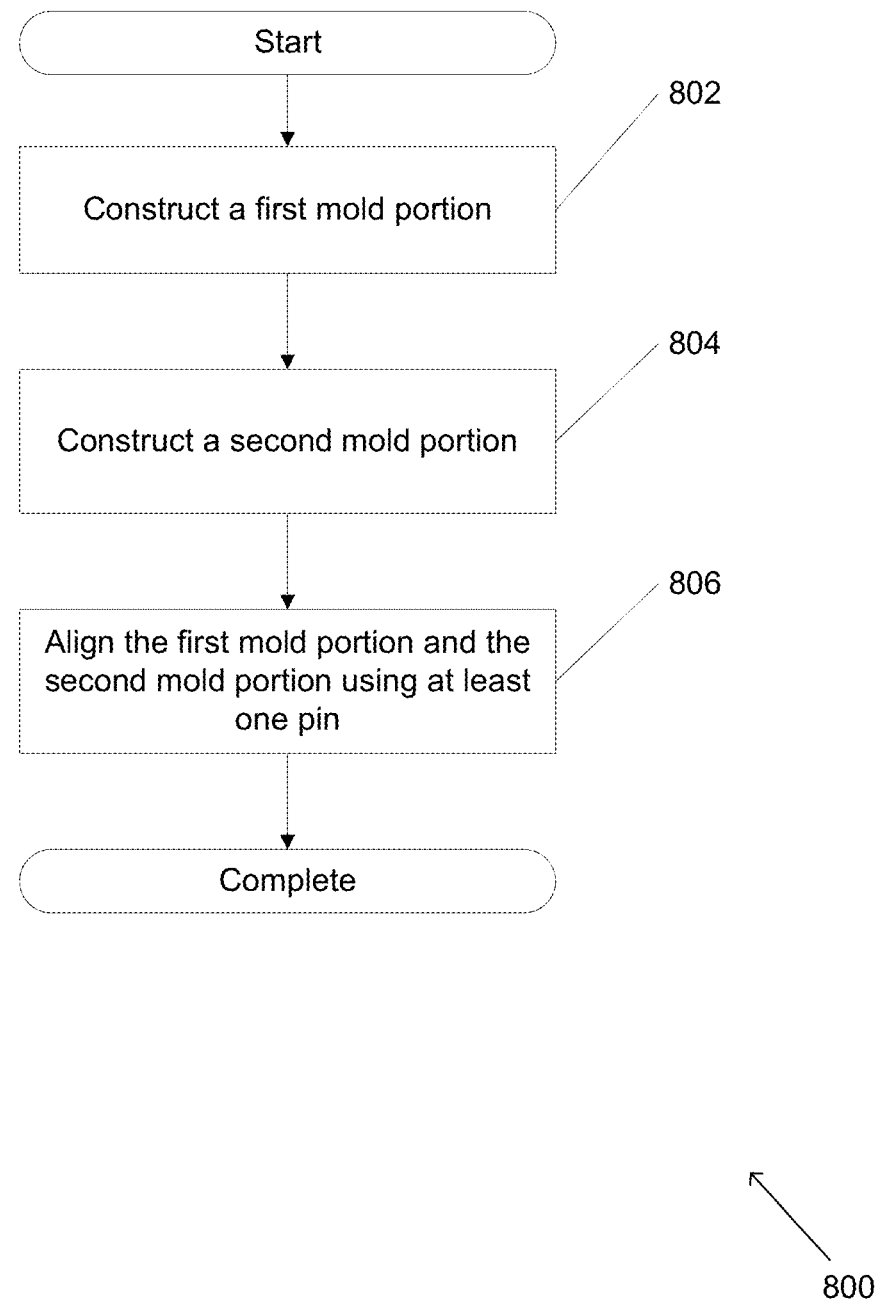
FIG. 8 is a flow chart illustrating a process for constructing a mold (may also be referred to as "a two-part mold") in accordance with an embodiment of the invention.

A flow chart illustrating a process for constructing (702) a two-part mold in accordance with an embodiment of the invention is illustrated in FIG. 8. The process 800 may include constructing (802) a first mold portion. In many embodiments, the first mold portion may have an inner surface corresponds to a portion of the outer surface of the pliable material. The process 800 may also include constructing (804) a second mold portion. In various embodiments, the second mold portion may have an inner surface corresponds to the remaining portion of the outer surface of the pliable material. Various methods known to one of ordinary skill in the art may be applied to construct the two-part mold. For example, various 3D printing processes may be used to construct the two-part mold, as further described above.

In further reference to FIG. 8, the process 800 may also include aligning (806) the first mold portion and the second mold portion to form a two-part mold. A variety of mechanisms known to one of ordinary skill in the art may be applied to align the first mold portion and the second mold portion. For example, at least one pin may be used to align the first mold portion and the second mold portion to form the two-part mold. Because a combination of the inner surfaces of the first mold portion and the second mold portion conforms to the interior contours of the user's hand while gripping, the inner surface of the two-part mold would also conform to the interior contours of the user's hand while gripping.

Although specific processes for constructing assistive gripping devices are discussed above with respect to FIGS. 7-8, any of a variety of processes including a variety of two-part mold constructing methods, the fixation of the first mold portion and the second mold portion, and the choice of the silicone materials as appropriate to the requirements of a specific application can be utilized in accordance with embodiments of the invention. While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A customized assistive gripping device, comprising:
   a body comprising:
      an outer surface that conforms to an interior contour of a particular user's hand in a gripping configuration, wherein the outer surface is customized to the interior contour of the particular user's hand in the gripping configuration;
      a plurality of ridges customized to the interior contour of the particular user's hand in the gripping configuration; and
      wherein the outer surface and the plurality of ridges of the body are customized to the interior contour of the particular user's hand in the gripping configuration by:
         receiving a pressure applied by the particular user's hand on a pliable material, wherein the pressure applied by the particular user's hand provides the interior contour of the particular user's hand onto the pliable material;
         generating 3D image data of the pliable material; and
         constructing the body of the customized assistive gripping device, wherein the body comprises the outer surface that conforms to the interior contour of the particular user's hand in the gripping configuration; and
   a slot located inside the body, wherein the slot comprises a first opening for receiving an object.

2. The customized assistive gripping device of claim 1, wherein the body further comprises a bottom portion that encloses the slot.

3. The customized assistive gripping device of claim 2, wherein the body further comprises a top portion, and wherein the slot is configured to receive the object from the top portion of the body via the first opening.

4. The customized assistive gripping device of claim 1, wherein the body further comprises a gap that spans from the first opening to a second opening in the body, wherein the slot is configured to receive the object from the gap.

5. The customized assistive gripping device of claim 1, wherein the body is formed using a 3D printing process.

6. The customized assistive gripping device of claim 1, wherein the body is made using polylactic acid.

7. The customized assistive gripping device of claim 1, wherein the slot comprises a silicone filler piece for securing the object.

8. The customized assistive gripping device of claim 4, wherein the body further comprises a hinge and a clasp, wherein the clasp is configured to close the gap.

9. The customized assistive gripping device of claim 1, further comprising an adjustable strap that extends from a first location of the body to a second location of the body.

10. The customized assistive gripping device of claim 9, wherein the adjustable strap is made of a hook-and-loop fastener.

* * * * *